Sept. 25, 1973   E. G. QUINIF   3,761,336
METHOD OF MAKING A RIGID LAMINATED CORE FOR A STRUCTURAL PANEL
Original Filed March 24, 1970
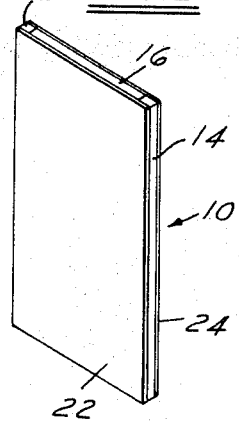
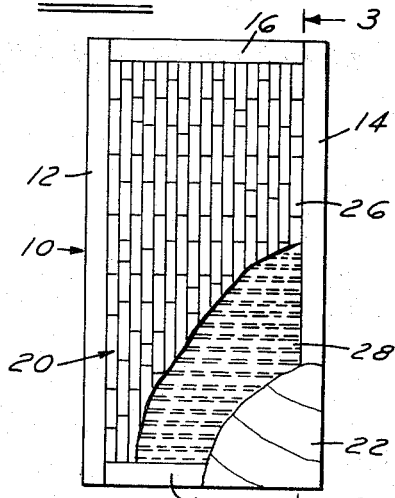
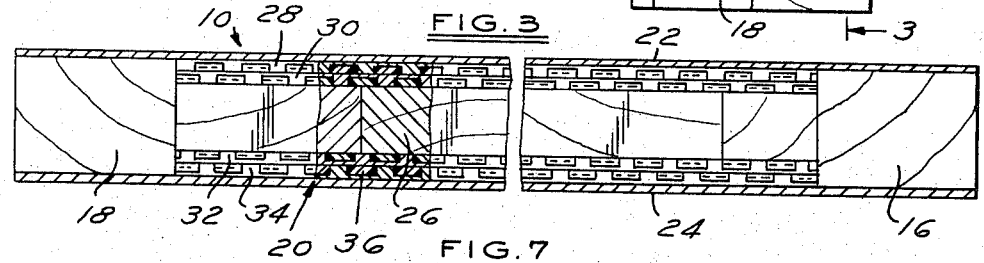
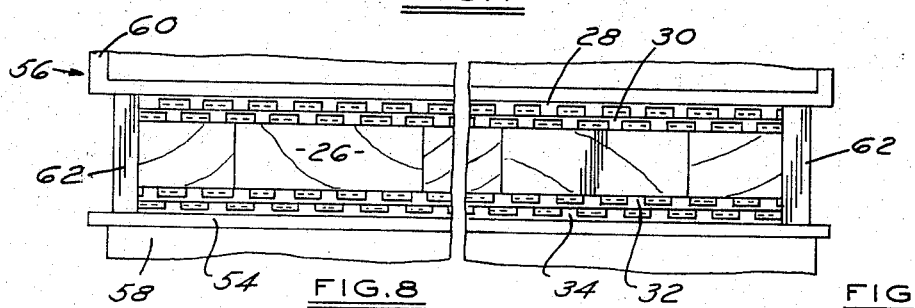
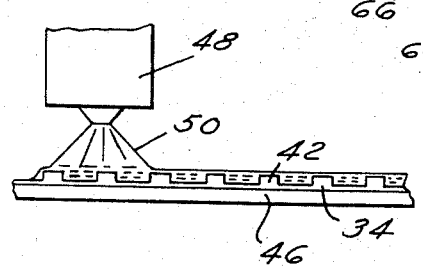
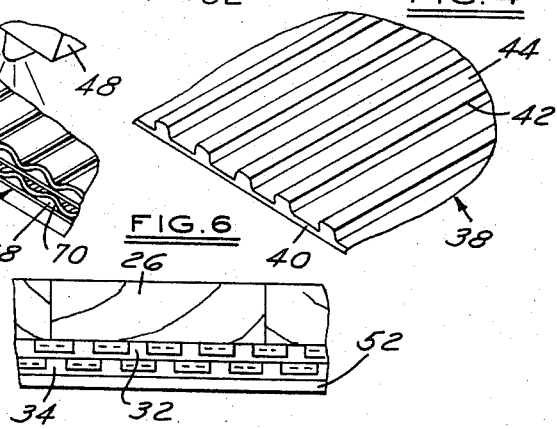
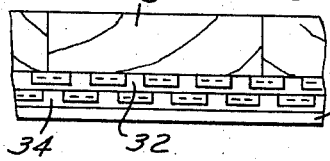

United States Patent Office 3,761,336
Patented Sept. 25, 1973

3,761,336
METHOD OF MAKING A RIGID LAMINATED CORE FOR A STRUCTURAL PANEL
Edward G. Quinif, Richmond, Ind., assignor to Walled Lake Door Co., Richmond, Ind.
Original application Mar. 24, 1970, Ser. No. 22,203, now abandoned. Divided and this application May 17, 1971, Ser. No. 144,344
Int. Cl. B31f 1/22
U.S. Cl. 156—210
8 Claims

ABSTRACT OF THE DISCLOSURE

The method of making an adhesive impregnated rigid laminated core structure for a structural panel including the steps of providing first and second corrugated sheets of compressible paper-like material, applying liquid heat-curable adhesive to the corrugated face of the first sheet to substantially fill the indentations between the ridges of the corrugated face, laying on the corrugated face of the first sheet a series of non-connected solid wood blocks in longitudinally extending rows to form a relatively thick loose assembly of wood blocks of generally rectangular configuration, applying uncured liquid heat-curable adhesive to the corrugated face of the second sheet in the same manner as the adhesive was applied to the first sheet and then placing the second sheet on the opposite side of the assembly of wood blocks with the corrugated face in contact therewith. Heat and pressure are applied simultaneously to both sides of the resultant core assembly to reduce the thickness of the sheets, impregnate each of the sheets to some extent with the adhesive, cure the adhesive and thereby secure the sheets to the assembly of wood blocks.

---

This application is a division of application Ser. No. 22,203, filed Mar. 24, 1970, now abandoned.

BACKGROUND OF THE INVENTION

One of the problems in running a large lumber mill or cut stock mill operation is the disposal of off-fall. Off-fall is the trim or waste pieces of lumber accumulated at mills as a result of cutting and sizing pieces of lumber. This material, in the past, has been difficult to dispose of because of the small size thereof, the blocks normally being under 10 inches in length. In accordance with the present invention, a solid core structural panel and method of making it are disclosed which inherently permits the profitable use of off-fall as a core member for the structural panel. The core avoids the problems inherent in some prior art structures wherein the wood blocks ultimately crease the exterior panel surface to form a visually undesirable appearance. Additionally, the method is economical, permitting inexpensive manufacture of structural panels and results in a sturdy panel construction.

SUMMARY OF THE INVENTION

The solid core structural panel comprises a frame, a core within the frame and a pair of outer panels secured to oppositely disposed faces of the frame and core. The core comprises a solid relatively thick inner member having compressible sheet structure overlying and secured to oppositely disposed faces thereof. The sheet structures are impregnated and covered with cured adhesive material and compressed from an original state to result in a substantially rigid structure.

The method of making the solid core comprises applying a layer of uncured liquid heat-curable adhesive to the fluted face of a first sheet of compressible corrugated paper-like material having at least one exposed fluted face. The inner member is placed on the adhesive coated face of the first sheet and then a second sheet of like nature has a fluted face coated with an adhesive layer, the coated face of the second sheet being applied to the opposite face of the inner member. Heat and pressure are then applied simultaneously to both sides of the resultant assembly to cure the adhesive material, compress the sheets and impregnate them to some extent with adhesive and secure the sheets to the inner member.

In the drawings:

FIG. 1 is a view in perspective of a door panel fabricated in accordance with one embodiment of the method of the present invention;

FIG. 2 is a front elevational view of the panel of FIG. 1 with portions broken away to reveal the interior structure thereof;

FIG. 3 is a sectional view taken substantially along the line 3—3 of FIG. 2 looking in the direction of the arrows;

FIG. 4 is a view in perspective of a segment of compressible sheet material utilized in fabricating the panel core;

FIG. 5 is a diagrammatic view illustrating application of adhesive material to one face of a compressible sheet forming one step of the method;

FIG. 6 is a diagrammatic view illustrating the step of laying wooden blocks on a pair of compressible sheets to which adhesive material has been applied;

FIG. 7 is a view illustrating a completely assembled panel core being acted upon by a hot press; and FIG. 8 is a view in perspective illustrating the step of applying adhesive material to another type of compressible sheet material.

FIGS. 1–3 illustrate the type of solid core structural panel which is manufactured in accordance with the invention. The panel 10 is a door structure and comprises a frame composed of side stiles 12, 14 and upper and lower rails 16, 18. The stiles and rails are preferably fabricated of wood and are secured together by any suitable means such as glue. A solid core 20 is mounted within the frame. The core 20 is a sandwich structure and its construction and the method of making it will be hereinafter described. The front and rear faces of the frame and core assembly are covered by suitable panels 22, 24 fabricated of a material such as plywood or hardboard. Similar paneling strips may be applied around the edges of the panel 10 if desired for the sake of appearance. While a door structure is illustrated, it will be appreciated that the invention is applicable to other structural panels such as room dividers, wall partitions and the like.

The core 20 comprises a plurality or an assembly of loosely laid non-edged glued or non-connected solid wood blocks 26 which are arranged in rows to form a rectangular shape matching the interior periphery of the panel frame. The blocks 26 are preferably low cost wood scraps termed "off-fall." Off-fall is normally the trim or waste pieces of lumber accumulated at cut stock mills as the result of normal operations. These pieces ordinarily have little or no value for resale and therefor form a desirable low cost material for manufacturing the present structural panel.

As will be noted in FIGS. 2 and 3, the blocks 26 are of substantially the same thickness and width but vary considerably in length. The blocks may be, for example, one and one-eighth (1⅛″) inches in thickness, two and seven-eights (2⅞″) inches in width, and four to nine inches in length. The blocks need not necessarily be uniform in width, rows of different width blocks being usable. However, the blocks must be of the same thickness. The core 20 is completed by two layers of sheets 28, 30 and 32, 34 adhered to the opposed faces of the panel defined by the blocks 26. These sheets are of a corrugated-type material and are impregnated and filled at the corrugated hollows thereof with an adhesive material 36 which causes the finally assembled sheets to adhere to each other and to the blocks 26 and also to assume a rigid form.

The method for making the core 20 is illustrated in FIGS. 4–7. As will be noted in FIG. 4, the compressible sheet material 38 comprises a flat back panel portion 40 having elongated longitudinally extending spaced apart parallel ridges 42 on one face thereof defining elongated indentations 44 therebetween. The sheet material 38 is formed of substantially a single sheet of the usual paper pulp type material and is termed "pillow pack." It is used widely for packaging merchandise for shipping. The consistency of pillow pack is similar to that of soft cardboard. While a compressible material having ridges on only one face is shown and is preferred, it is possible to use material of a type having ridges on both sides thereof. Additionally, kraft-type board having two flat faces with corrugated material between may be used although it does not result in a product which is as satisfactory as that produced by use of the compressible sheet material 38.

In the first step of the method (FIG. 5), a sheet of compressible material 34 is guided on a support surface 46 beneath a spray device 48 whereupon a spray 50 of liquid adhesive material 36 is directed on the fluted face having the ridges 42 to substantially fill the indentations or hollow corrugation spaces between the ridges. The adhesive material may be any conventional heat-curable material which becomes rigid and adherent upon curing at an elevated temperature. For example, melamine-urea and urea-formaldehyde adhesives are satisfactory. A second sheet 32 is then laid on sheet 34 and a layer of adhesive applied thereto.

The adhesive filled sheets 32, 34 are then as shown in FIG. 6 laid on a support platen 52 with the flat surfaces of the compressible sheets positioned on the down-side. The blocks 26 are then laid on the sheets 32, 34 to form the desired rectangular configuration as previously described.

A second set of compressible sheets 28, 30 are then coated with adhesive and placed on top of the wood block assembly. The sheets 28, 30 are laid in place with the ridges facing the blocks 26 and the flat surface facing upwardly. This assembly is then placed on a support platen 54 and set on a hot press 56. At this point in time, the overall thickness of the assembly, including the filled sheets 28, 30, 32, 34 and blocks 26, is somewhat thicker than the finally desired panel, for example, with a desired door core thickness of 1½ inches, the assembly may initially be 1¾ inches in thickness.

The hot press 56 includes a fixed table 58 which supports the assembly and a movable ram 60 which is normally spaced above the table 58 a distance to permit insertion thereof into the press. A plurality of spacer bars 62 are provided around the edges of the platen 54 to control the extent of movement of the ram 60 to result in a final desired core thickness as, for example, 1½ inches. The table 58 and ram 60 are each provided with suitable conventional heating structures such as a steam platen or high frequency electrical heater unit.

After the assembly has been located in the hot press 56, the press is actuated causing the ram 60 to move downwardly until contact is made with the spacer bars 62 thus compressing the assembly to the desired thickness. At the same time, heat is applied causing the adhesive material to cure while at the same time, as a result of the pressure, impregnating the compressible sheets to some extent. After the assembly has been in the press for a satisfactory period, for example five minutes at 300° F., it is removed. At this time, the compressible sheets are rigid and are adhered to the blocks 26 thus resulting in a unitary core 20. This core is placed in the rectangular frame and the exterior panels 22, 24 are secured thereto as by use of an adhesive to complete the panel 10.

FIG. 8 illustrates the use of compressible sheets 64, 66. Each of these sheets comprises a flat backing member 68 having a corrugated member 70 on one face thereof. The member 70 is corrugated in the usual fashion. The members 68, 70 are fabricated of the usual paper-like material. These members are filled with adhesive from the spray device 48 as previously described and are utilized in fabrication of the core in the manner previously discussed.

What I claim as my invention is:

1. The method of making an adhesive impregnated rigid laminated core structure for a structural panel comprising providing first and second corrugated sheets of compressible paper-like material, with each sheet having at least one corrugated face and also having the characteristic that it is compressible when subjected to pressure to reduce the thickness thereof, applying uncured liquid heat-curable adhesive in suitable volume to the corrugated face of said first sheet to substantially fill the indentations between the ridges of the corrugated face, laying on the corrugated face of said first sheet a series of nonconnected solid wood blocks in longitudinally extending rows to form a relatively thick loose assembly of wood blocks of generally rectangular configuration, with the adjacent wood blocks in each row in close proximity to one another and with the wood blocks in adjacent rows also in close proximity to form said assembly of wood blocks, applying uncured liquid heat-curable adhesive to the corrugated face of said second sheet to substantially fill the indentations between the ridges of the corrugated face, placing said second sheet on the opposite side of said assembly of wood blocks with the corrugated face in contact therewith, and then simultaneously applying heat and pressure to both sides of the resultant core assembly to reduce the thickness of said sheets, impregnate each of said sheets to some extent with the adhesive and to cure the adhesive and thereby secure the sheets to the assembly of wood blocks to form a core structure having rigid sides thereon.

2. The method of making an adhesive impregnated rigid laminated core structure as defined in claim 1 including the step of subjecting the resultant core assembly to a temperature of at least 300° F.

3. The method of making an adhesive impregnated rigid laminated core structure as defined in claim 2 wherein the pressure and temperature are applied for a time period of at least five minutes.

4. The method of making an adhesive impregnated rigid laminated core structure as defined in claim 1 wherein the uncured liquid-heat curable adhesive is in the form of a urea type resin.

5. The method of making an adhesive impregnated rigid laminated core structure as defined in claim 1 including the step of limiting the reduction in height of said first and second corrugated sheets to a predetermined amount in order to produce a core structure of desired thickness.

6. The method of making an adhesive impregnated rigid laminated core structure as defined in claim 1 wherein said first and second corrugated sheets provided are solid, with each sheet having a flat face and a corrugated face.

7. The method of making an adhesive impregnated rigid laminated core structure as defined in claim 1 wherein each of said first and second corrugated sheets provided have corrugated faces on the sides thereof.

8. The method of making an adhesive impregnated core structure as defined in claim 1 including the steps of providing third and fourth corrugated sheets of identical configuration to said first and second corrugated sheets, applying uncured liquid heat-curable adhesive in suitable volume to the corrugated faces of said third and fourth corrugated sheets to substantially fill the indentations between the ridges of the corrugated faces on said third and fourth sheets, and applying said third and fourth corrugated sheets to the opposite sides of the core assembly with the corrugated faces thereof in contact with the first and second sheets respectively prior to applying heat and pressure.

References Cited
UNITED STATES PATENTS

| | | | |
|---|---|---|---|
| 3,168,763 | 2/1965 | Gilbert | 161—44 X |
| 2,209,537 | 7/1940 | Perry | 161—123 |
| 2,744,624 | 5/1956 | Hoogstoel et al. | 156—278 |
| 2,933,228 | 4/1960 | Guyer | 229—49 X |
| 2,122,479 | 7/1938 | London | 156—292 X |
| 3,434,901 | 3/1969 | Griffiths et al. | 156—210 |

RALPH S. KENDALL, Primary Examiner

U.S. Cl. X.R.

156—292; 161—43, 137